United States Patent [19]

Skinner

[11] 4,176,210
[45] Nov. 27, 1979

[54] PROCESS FOR MAKING URETHANE COATED DECORATIVE SHEET-TYPE COVERING MATERIAL

[75] Inventor: David B. Skinner, Allentown, Pa.

[73] Assignee: GAF Corporation, New York, N.Y.

[21] Appl. No.: 786,885

[22] Filed: Apr. 12, 1977

[51] Int. Cl.$^2$ ............................ B05D 5/00; B05D 1/36
[52] U.S. Cl. ..................................... 427/258; 427/373; 427/379; 427/381; 427/407 R; 428/159; 428/203; 428/315
[58] Field of Search ................... 427/407 R, 381, 379, 427/373, 258; 428/158, 159, 203, 315

[56] References Cited

U.S. PATENT DOCUMENTS

| | | | |
|---|---|---|---|
| 3,428,471 | 2/1969 | Tuthill et al. | 427/373 |
| 3,458,337 | 7/1969 | Rugg | 427/373 |
| 3,905,849 | 9/1975 | Bomboire | 428/159 |
| 3,931,429 | 1/1976 | Austin | 428/158 |
| 3,978,258 | 8/1976 | Faust et al. | 428/160 |
| 4,022,943 | 5/1977 | Erb et al. | 427/258 |
| 4,059,709 | 11/1977 | Conger et al. | 427/264 |

Primary Examiner—Harry J. Gwinnell
Assistant Examiner—Sadie L. Childs
Attorney, Agent, or Firm—Walter C. Kehm; Joshua J. Ward

[57] ABSTRACT

Decorative sheet-type covering material having both PVC and polyurethane wear layers is made by first forming a sheet of gelled foamable PVC plastisol or organosol on a substrate. A layer of nonfoamable PVC plastisol or organosol is then applied to the gelled foamable layer and gelled, but not cured. A layer of polyurethane is then applied to the gelled nonfoamable layer and the entire sheet is heated to a temperature sufficient to decompose the blowing agent in the foamable layer and cure both of the PVC layers and the polyurethane layer.

5 Claims, No Drawings

PROCESS FOR MAKING URETHANE COATED DECORATIVE SHEET-TYPE COVERING MATERIAL

BACKGROUND OF THE INVENTION

In the manufacture of decorative sheet-type covering material such as sheet vinyl floor and wall coverings, it is frequently desired to provide a product which has a foamed vinyl layer on top of which is a PVC wear layer which in turn is covered with a polyurethane wear layer. The polyurethane wear layer serves to provide high gloss and the PVC wear layer to increase the useful life of the product if the polyurethane wear layer should wear through in spots. Previously such material has been made by first forming a conventional product having a foamed layer with a cured PVC wear layer and subsequently applying and curing the polyurethane wear layer on top of the previously cured PVC wear layer. This method of manufacture has effectively precluded the use of chemical embossing of the type described for instance in U.S. Pat. No. 3,458,337 since efficient coating with the relatively thin polyurethane wear layers used is possible only by the use of reverse or direct roll coaters. Other methods of application of the polyurethane finish are less desirable than roll coaters for various reasons. Losses from spray application are relatively very high. Air-knife systems introduce solvent fume disposal problems and certain coaters have not proven practical in maintaining acceptable thickness levels on wide sheets. Roll coaters, however, function best on level surfaces. In practice use of roll coaters to apply the polyurethane wear layer has required that the polyurethane layer be applied before embossing of the material. This has, in conventional methods of manufacture, precluded the use of chemical embossing and mandated that any embossing be via mechanical procedures.

A further disadvantage in conventional methods of manufacturing urethane coated foamed sheet covering materials has been the fact that wrinkling of the urethane layer has been encountered if the urethane layer is applied to a freshly cured PVC wear layer. This has frequently required storage of material to which a PVC wear layer has been applied and cured for a period of two to three weeks before a polyurethane wear layer could be applied without danger of wrinkling of the polyurethane layer during curing thereof.

SUMMARY OF THE INVENTION

It is therefore an object of the present invention to provide an improved process for making decorative sheet-type covering material having a foamed PVC layer covered with successive layers of cured PVC and polyurethane wear layers.

In accordance with the invention, a process for making decorative sheet-type covering material is provided, which process comprises the steps of:

(a) Forming sheet material comprising a layer of gelled foamable PVC plastisol or organosol on a substrate, said layer containing a blowing agent;

(b) applying a layer of nonfoamable PVC plastisol or organosol to said gelled foamable layer;

(c) gelling said layer of nonfoamable PVC plastisol or organosol;

(d) applying a layer of uncured polyurethane to the gelled layer of nonfoamable PVC plastisol or organosol; and (e) then heating said sheet material to a temperature sufficient to decompose said blowing agent and cure all of said PVC and polyurethane layers.

DETAILED DESCRIPTION OF THE INVENTION

As mentioned above, the process of the invention broadly comprises the steps of:

(a) Forming sheet material comprising a layer of gelled foamable PVC plastisol or organosol on a substrate, said layer containing a blowing agent;

(b) applying a layer of nonfoamable PVC plastisol or organosol to said gelled foamable layer; (c) gelling said layer of nonfoamable PVC plastisol or organosol;

(d) applying a layer of uncured polyurethane to the gelled layer of nonfoamable PVC plastisol or organosol; and (e) then heating said sheet material to a temperature sufficient to decompose said blowing agent and cure all of said PVC and polyurethane layers.

The substrate used in practicing the invention may be any suitable supporting material such as an asbestos sheet, a nonwoven fibrous web, a woven fibrous web, a plastisol layer, a plastisol layer on felt backing, etc. While almost any flexible base substrate may be used, the preferred substrate is felt, most advantageously an impregnated asbestos felt or a resin impregnated cellulose or other organic felt or, with suitable sealing coats, an asphalt saturated organic felt. While felt is preferred, paper sheet, cloth or even metal foil may be used for some purposes such as wall coverings.

The use of a sealing or a priming coat is not considered essential, but is preferred, especially where a felt base is used. Where used, the sealing or priming coat may be made up of a latex, for example, a latex containing an acrylic polymer with or without pigments or fillers such as the prime coat described in U.S. Pat. No. 3,458,337 to Rugg, the disclosure of which is incorporated herein by reference.

The foamable layer of PVC plastisol or orgnosol used in practicing the invention may be any of the various PVC resin materials normally used in the manufacture of foamed layers of decorative sheet materials and may specifically include, but is not limited to those described in the above mentioned U.S. Pat. No. 3,458,337. The foamable layer of PVC plastisol or orgnosol will of course contain a suitable blowing agent or a catalyst-activated blowing agent such as is well known in the art for producing foamed plastisol or organosol layers. Suitable blowing agents include for instance those mentioned in U.S. Pat. No. 3,458,337 such as azodicarbonamid (ABFA).

The layer of nonfoamable PVC plastisol or organosol used in the invention may also be any of the conventional materials known in the art for use as PVC wear layers. Suitable materials include those described for instance in the above mentioned U.S. Pat. No. 3,458,337.

Polyurethanes used in the invention may also include any of the polyurethanes normally used to provide wear layers on decorative sheet-type covering material. These may include urethane lacquers as well as polyurethane prepolymer packages of the type well known in the art. While a wide variety of polyurethanes and polyurethane prepolymers may be used as the uncured polyurethane layer used in the invention, it is preferred where clear wear layers are desired to use polyurethane of the aliphatic or cycloaliphatic type since aromatic urethanes have a strong tendency toward discoloration. Suitable polyurethanes may be prepared in a conventional manner such as by reacting hydroxylated polymers with organic polyisocyanates in the manner well known in the art. Suitable organic polyisocyanates include, for instance, ethylene diisocyanate; ethylidene diisocyanate; propylene-1,2-diisocyanate; cyclohexylene-1,2-diisocyanate; m-phenylene diisocyanate; 2,4-toluene diisocyanate; 2,6-toluene diisocyanate; 3,3'-dimethyl-4,4'-biphenylene diisocyanate; p,p',p''-triphenylmethane triisoene diisocyanate; 3,3'-diphenyl-4,4'-biphenylene diisocyanate; 4,4'-biphenylene diisocyanate; 3,3'-dichloro-4,4'-biphenylene diisocyanate; p,p',p''-triphenylmethane triisocyanate; 1,5-nepthalene diisocyanate; furfurylidene diisocyanate or polyisocyanates, in a blocked or inactive form such as the bis-phenyl carbamates of 2,4- or 2,6-toluene diisocyanate; p,p'-diphenyl methane diisocyanate; p-phenylene diisocyanate; 1,5-naphthalene diisocyanate and the like.

Polyurethanes applied as coatings in accordance with the invention may, of course, be in the form of solutions in suitable solvents such as xylene, toluene, etc.

Materials for the polyurethane coatings may be supplied in 1 package or 2 package prepolymer systems or oil modified systems, etc., all in the manner well known in the industry. Such materials are described for instance in the pamphlet "Urethane Coatings," published by the Federation of Societies for paint Technology (1970). Radiation-curable urethane coatings may also of course be used. Where clear wear layers are desired, a decorative design may be printed on the foamed, gelled PVC layer in a conventional manner. In a preferred embodiment of the invention, ink containing a suppressant for the blowing agent is preferably used in printing the pattern on the unfoamed foamable layer so that upon foaming selected areas of the layer are foamed by decomposition of the blowing agent while areas covered by the suppressant ink are not foamed. The suppressant may be a direct suppressant, but more usually is an inhibitor for a catalyst used to catalyze decomposition of the blowing agent used. In either case the blowing agent suppressant will migrate into the wet plastic layer of unfoamed foamable PVC in the areas on which such suppressant is printed and will substantially inhibit the foaming of the foamable layer in such areas. Suitable suppressants are known in the art and include those described in the above mentioned U.S. Pat. No. 3,458,337. Suitable suppressants include for instance benzotriazole and aminotriazole. Chemical embossing as described in the above mentioned U.S. Pat. No. 3,458,337, can thus be practiced in conjunction with the process of the invention, whereas it cannot normally be used in conjunction with more conventional methods of producing the products resulting from the process of the present invention.

While thickness of the various layers involved in the process of the invention is not generally critical, preferred embodiments of the invention, especially when using preferred gelling and curing conditions described below, generally include a thickness between about 2 and about 50 mils for the foamable PVC layer prior to foaming with a thickness for the same layer subsequent to decomposition of the blowing agent of between about 4 and about 200 mils in areas where suppressant ink has not been applied. Nonfoamable PVC layers are generally applied in thicknesses between about 1 and about 50 mils while the cured polyurethane layer is generally between about 0.5 and about 5 mils thick.

In practicing the invention, the various layers of materials used may be applied in a conventional manner. As mentioned above, the use of roll coaters or reverse roll coaters is preferred in applying the uncured polyurethane layer. Both the foamable and the nonfoamable PVC layers may be applied by the use of any suitable equipment such as knife coaters or reverse roll or roll coaters.

As indicated above, the foamable PVC plastisol or organosol layer is applied to a substrate and gelled with the nonfoamable PVC layer then being applied and gelled before application of the polyurethane layer. The gelling of the PVC layers is carried out in a conventional manner. In gelling the foamable layer, it is of course necessary to heat the layers sufficiently to gel the PVC plastisol or organosol, but not sufficiently to decompose the blowing agent contained in the foamable layer. The same applies to gelling of the nonfoamable PVC layer since this is applied and gelled prior to foaming of the foamable layer.

Following application and gelling of the foamable and nonfoamable PVC layers and application of the uncured polyurethane layer the entire sheet is, in accordance with the invention, subjected to a temperature sufficient to cure the PVC and polyurethane layers (e.g., to fuse PVC plastisols or organosols and to effect curing of polyurethane by initiating cross-linking or driving off solvents) and also to decompose the blowing agent used in the foamable PVC layer. Typical blowing agent systems have decomposition temperatures within a range of about 300° F. to about 400° F. Typical conditions for gelling without decomposing blowing agents therefore involve exposure to temperatures of for instance about 250° F. for periods of about two to four minutes or higher temperatures for correspondingly shorter periods of time. Higher temperatures, even those above the decomposition temperature of blowing agents used, may be used provided the material is not exposed to such temperatures for a sufficient period of time for the foamable layer containing the blowing agent to reach the decomposition temperature of the blowing agent. In practicing the invention gelling conditions in general range all the way from 250° F. to 400° F. with exposure times of from about ten seconds to about three minutes, it being recognized that the gelling conditions must be adjusted according to the ingredients used and thicknesses of layers so that the PVC layers are gelled without decomposition of the blowing agent.

Once the foamable and nonfoamable PVC plastisol or organosol layers have been applied and gelled and the uncured layer of polyurethane has been applied, the material is then subjected to sufficient temperature to completely cure the various plastic layers and decompose the blowing agent contained in the foamable layer. In general this involves exposure to temperatures between about 300° F. and about 400° F. for times of one to three minutes. While this curing may be performed in a single heating zone, a preferred embodiment of the invention involves use of a two-zone heating operation in which the sheet material is exposed in a first heating zone to a temperature between about 250° F. and about 320° F. for a time of about one to about three minutes followed by exposure to temperatures between about 320° F. and about 450° F. for a time of about one to about three minutes. In the two-zone heating process the first zone is intended primarily to remove solvent from the uncured urethane layer while the second zone is intended primarily to decompose the blowing agent and complete the cure of the PVC and polyurethane layers.

In curing the PVC and polyurethane layers in accordance with a preferred embodiment of the invention in which the polyurethane is applied with a solvent, the two-zone curing described immediately above is frequently preferred in order to avoid heating the material so fast that the solvent bubbles or skins over, thereby creating undesirable and nonuniform conditions in the cured polyurethane layer.

The following examples illustrate various possible embodiments of the invention, but are not intended to limit the scope of the invention.

EXAMPLE I

In this example the substrate may be a 30 mil thick sheet of asbestos felt onto which is doctored a latex-sized coating which acts as a barrier against plasticizer migration and improves adhesion of the vinyl foam layer. A foamable PVC coating 10 mils thick may then be applied to the latex coated felt using a knife coater and gelled for two and one half minutes at 275° F. in a forced-air oven. The PVC coating is a PVC plastisol having the following composition.

| INGREDIENT | PARTS BY WEIGHT |
| --- | --- |
| PVC homopolymer dispersion resin | 50 |
| PVC homopolymer suspension resin | 50 |
| Butyl benzyl phthalate | 30 |
| Dioctyl phthalate | 20 |
| Epoxidized soya oil | 6 |
| Zinc-Cadmium catalyst | 2.5 |
| Azodicarbonamide | 2.5 |
| Titanium dioxide | 7.5 |

A decorative design may then be printed onto the gelled plastisol coat after which a 10 mil thick PVC wear layer may be applied and gelled for fifteen seconds using infrared heaters. A suitable PVC wear layer comprises:

| INGREDIENT | PARTS BY WEIGHT |
| --- | --- |
| PVC homopolymer dispersion resin | 100 |
| Dioctyl phthalate | 40 |
| Cadmium soap stabilizer | 5 |

Immediately after gellation of the PVC wear layer and prior to rolling for storage a fifty percent solids urethane coating is applied with a reverse roll coater in a thickness of 4 mils. The composite sheet is then heated in a two-zone oven, one oven being maintained at 300° F. and the other zone being at 375° F. with a 1½ minute residence time in each zone. The completed product exiting from the oven is flat with a cross-linked urethane coated surface, has a PVC foam layer 30 mils thick, a fused PVC wear layer and a cured polyurethane layer 2 mils thick. The product can be mechanically embossed if desired.

EXAMPLE II

In this example sheet material is made by a process identical to that of Example I except that a mortar design is printed on the gelled foamable PVC layer prior to application of the nonfoamable PVC wear layer. The mortar areas of the design are printed with an ink containing a suppressant for the ABFA. The completed product in this case has depressed areas corresponding to the areas printed with the suppressant ink.

EXAMPLE III

In this example the substrate was a 30 mil thick sheet of asbestos felt onto which was doctored a latex-sized coating which acted as a barrier against plasticizer migration and improved adhesion of the vinyl foam layer. A foamable PVC coating 10 mils thick was then applied to the latex coated felt using a knife coater and gelled for two and one half minutes at 275° F. in a forced-air oven. The PVC coating was a PVC plastisol having the following composition.

| INGREDIENT | PARTS BY WEIGHT |
| --- | --- |
| PVC homopolymer dispersion resin | 50 |
| PVC homopolymer suspension resin | 50 |
| 2,2,4 Trimethyl pentanediol isobutyrate benzoate plasticizer | 50 |
| Epoxidized soya oil | 6 |
| Zinc-Cadmium catalyst | 2.5 |
| Azodicarbonamide | 2.5 |
| Titanium dioxide | 7.5 |

A decorative design was then printed onto the gelled plastisol coat after which a 10 mil thick PVC wear layer was applied and gelled for 2½ minutes at 305° F. in a forced-air oven. The PVC wear layer comprised:

| INGREDIENT | PARTS BY WEIGHT |
| --- | --- |
| PVC homopolymer dispersion resin | 100 |
| Dioctyl phthalate | 20 |
| 2,2,4 Trimethyl pentanediol isobutyrate benzoate plasticizer | 30 |
| Cadmium soap stabilizer | 5 |

Several days after gellation of the PVC wear layer a fifty percent solids urethane coating was applied with a reverse roll coater in a thickness of 4 mils. The composite sheet was then heated in a two-zone oven, one oven being maintained at 300° F. and the other zone being at 375° F. with a 1½ minute residence time in each zone. The completed product exiting from the oven was flat with a cross-linked urethane coated surface, had a PVC foam layer 30 mils thick, a fused PVC wear layer and cured polyurethane layer 2 mils thick. The resulting product was then mechanically embossed.

While the invention has been described above with respect to preferred embodiments thereof it will be understood that various changes may be made without departing from the spirit or scope of the invention.

What is claimed is:

1. Process for making decorative sheet-type covering material comprising the steps of:
   (a) forming sheet material comprising a layer of gelled foamable PVC plastisol or organosol on a substrate, said layer containing a blowing agent;
   (b) applying a layer of nonfoamable PVC plastisol or organosol to said gelled foamable layer;
   (c) gelling said layer of nonfoamable PVC plastisol or organosol;
   (d) applying a layer of uncured polyurethane to the gelled layer of nonfoamable PVC plastisol or organosol; and (e) then heating said sheet material to a temperature sufficient to decompose said blowing agent and cure all of said PVC and polyurethane layers.

2. Process according to claim 1 wherein step (c) is carried out by heating the sheet material to a temperature of between about 250° F. and 400° F. for a time of about between ten seconds and about three minutes.

3. Process according to claim 1 wherein a printed layer, at least some portions of which contain a suppressant for the blowing agent contained in the foamable layer, is applied to the gelled foamable layer prior to application of the nonfoamable layer thereto.

4. Process according to claim 1 wherein the substrate comprises a layer of felt, the layer of foamable PVC plastisol or organosol is between about 2 and about 50 mils thick, the layer of nonfoamable PVC plastisol or organosol is between about 1 and about 50 mils thick, and the cured polyurethane layer is between about 0.5 and about 5 mils thick.

5. Process according to claim 4 wherein the heating of the sheet material is carried out by first subjecting the material to a temperature between about 250° F. and about 310° F., such temperature being below the decomposition temperature of the blowing agent, for a time between about one and three minutes and then subjecting such material to a temperature between about 320° F. and 450° F., such temperature being above the decomposition temperature of the blowing agent, for a time between about one and about three minutes.

* * * * *